United States Patent
Oishi

(10) Patent No.: US 10,353,624 B2
(45) Date of Patent: *Jul. 16, 2019

(54) APPARATUS AND METHOD FOR WRITING DATA TO RECORDING MEDIUM

(71) Applicant: International Business Machines Corporation, Armonk, NY (US)

(72) Inventor: Yutaka Oishi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/813,063

(22) Filed: Jul. 29, 2015

(65) Prior Publication Data
US 2015/0331636 A1    Nov. 19, 2015

Related U.S. Application Data

(63) Continuation of application No. 12/420,631, filed on Apr. 8, 2009, now Pat. No. 9,122,425.

(30) Foreign Application Priority Data

Apr. 23, 2008    (JP) .................................. 2008-112560

(51) Int. Cl.
*G06F 3/00*    (2006.01)
*G06F 5/00*    (2006.01)
(Continued)

(52) U.S. Cl.
CPC .......... *G06F 3/0656* (2013.01); *G06F 3/0613* (2013.01); *G06F 3/0673* (2013.01); *G06F 5/12* (2013.01)

(58) Field of Classification Search
CPC ........ G06F 5/12; G06F 3/0673; G06F 3/0613; G06F 3/0656
(Continued)

(56) References Cited

U.S. PATENT DOCUMENTS

4,757,396 A * 7/1988 Ishiguro ................ G06F 3/0601
                                                       360/39
4,868,737 A    9/1989 Soederlund
(Continued)

FOREIGN PATENT DOCUMENTS

JP    5769514 A    4/1982
JP    03171322 A    7/1991
(Continued)

OTHER PUBLICATIONS

Advisory Action from U.S. Appl. No. 12/420,631, dated Nov. 23, 2011.
(Continued)

*Primary Examiner* — Chun Kuan Lee
(74) *Attorney, Agent, or Firm* — Zilka-Kotab, P.C.

(57) ABSTRACT

A method for writing data in a buffer to a magnetic recording tape includes identifying a size of an unused area of the magnetic recording tape based on a current writing position on the magnetic recording tape. An upper limit of a capacity for data that can be stored in the buffer is determined based on the size of the unused area. The predetermined data is stored, according to a command for storing predetermined data in the buffer, in the buffer on condition that the capacity for data in the buffer does not exceed the upper limit.

12 Claims, 5 Drawing Sheets

(51) Int. Cl.
*G06F 3/06* (2006.01)
*G06F 5/12* (2006.01)

(58) Field of Classification Search
USPC .......................................................... 710/53
See application file for complete search history.

(56) References Cited

U.S. PATENT DOCUMENTS

| | | | |
|---|---|---|---|
| 5,287,478 A | | 2/1994 | Johnston et al. |
| 5,677,807 A | * | 10/1997 | Sakai ................ G11B 15/1875 360/64 |
| 7,116,506 B1 | * | 10/2006 | Mojica ................... G11B 15/06 360/71 |
| 7,868,803 B2 | | 1/2011 | Muraki et al. |
| 9,122,425 B2 | | 9/2015 | Oishi |
| 2005/0088771 A1 | * | 4/2005 | Jaquette ................ G11B 15/46 360/73.04 |
| 2009/0271544 A1 | | 10/2009 | Oishi |
| 2010/0085228 A1 | | 4/2010 | Muraki et al. |

FOREIGN PATENT DOCUMENTS

| | | |
|---|---|---|
| JP | 06243661 A | 9/1994 |
| JP | 08235880 A | 9/1996 |
| JP | 1165818 A | 3/1999 |
| JP | 11162149 A | 6/1999 |
| JP | 2004171541 A | 6/2004 |
| JP | 2006196071 A | 7/2006 |
| JP | 2006221695 A | 8/2006 |
| JP | 2006311320 A | 11/2006 |
| WO | 2008044725 A1 | 4/2008 |

OTHER PUBLICATIONS

Corrected Notice of Allowability from U.S. Appl. No. 12/420,631, dated Jun. 1, 2015.
Examiner's Answer to Appeal Brief from U.S. Appl. No. 12/420,631, dated Apr. 11, 2012.
Final Office Action from U.S. Appl. No. 12/420,631, dated Aug. 12, 2011.
Non-Final Office Action from U.S. Appl. No. 12/420,631, dated Mar. 14, 2011.
Notice of Allowance from U.S. Appl. No. 12/420,631, dated Apr. 30, 2015.
Patent Board Decision on Appeal from U.S. Appl. No. 12/420,631, dated Feb. 18, 2015.
Statement of Relevance of Non-Translated Foreign Document JPH03171322A.
Statement of Relevance of Non-Translated Foreign Document JPS57069514A.
Oishi, Y., U.S. Appl. No. 12/420,631, filed Apr. 8, 2009.

* cited by examiner (a)

(b)

APPARATUS AND METHOD FOR WRITING DATA TO RECORDING MEDIUM

This application is a continuation of U.S. application Ser. No. 12/420,631 filed Apr. 8, 2009, which claims priority to Japanese Application No. 2008-112560 filed Apr. 23, 2008, from each of which priority is claimed and which are herein incorporated by reference.

BACKGROUND OF THE INVENTION

1. Field of the Invention

The present invention relates to an apparatus and a method for writing data to a recording medium, and more particularly, to an apparatus and a method for writing data in a buffer to a recording medium according to a command from a higher-level device.

2. Background Information

A tape drive that writes data to a tape medium, such as a magnetic tape, is capable of returning a warning message to a host computer (hereinafter referred to as "host") when the end of the tape medium approaches. In general, the tape drive temporarily stores data sent from the host in a buffer memory (hereinafter referred to as "buffer") and writes the data stored in the buffer to the tape medium with predetermined timing. The tape drive is capable of returning a warning message to the host so that all the data stored in the buffer can be written to the tape medium.

There have been discussions about at which point on the tape medium a warning message should be issued. It is known in the prior art, that the number of data sets stored in the buffer memory is compared with information about a current writing position on the tape so as to determine whether to inform the host of the logical end of tape (LEOT). Other prior art attempts include a technique wherein a recording capacity of an unrecorded area can be calculated as an amount of data and a technique wherein a remaining capacity of a magnetic tape can be determined in consideration of a data compression ratio.

Accordingly, an object of the invention is allow data in a buffer to be completely written to a recording medium while maintaining a high level of recording efficiency on the recording medium.

SUMMARY OF THE INVENTION

An apparatus for writing data in a buffer to a recording medium according to a command from a higher-level device is provided according to one embodiment. The apparatus includes an identifying unit configured to identify a distance from a current position for writing on the recording medium to an end of the recording medium. A determining unit is configured to determine, based on the distance to the end of the recording medium, an upper limit of a capacity for data that can be stored in the buffer. A storage unit is configured to store, according to a command for storing predetermined data in the buffer, the predetermined data in the buffer on condition that the capacity for data in the buffer does not exceed the upper limit. The predetermined data in the buffer includes a plurality of data sets. The determining unit is configured to determine the number of data sets corresponding to a capacity of the buffer as the upper limit when the distance to the end of the recording medium exceeds a predetermined threshold. The determining unit is configured to determine the number of data sets corresponding to a capacity smaller than the capacity of the buffer as the upper limit when the distance to the end of the recording medium is less than or equal to the predetermined threshold.

A method for writing data in a buffer to a magnetic recording tape includes identifying a size of an unused area of the magnetic recording tape based on a current writing position on the magnetic recording tape. An upper limit of a capacity for data that can be stored in the buffer is determined based on the size of the unused area. The predetermined data is stored, according to a command for storing predetermined data in the buffer, in the buffer on condition that the capacity for data in the buffer does not exceed the upper limit.

A computer program product includes a computer readable storage medium having program instructions embodied therewith, the program instructions executable by a controller to cause the controller to perform the foregoing method.

Other, advantages and embodiments of the invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Figure 1:
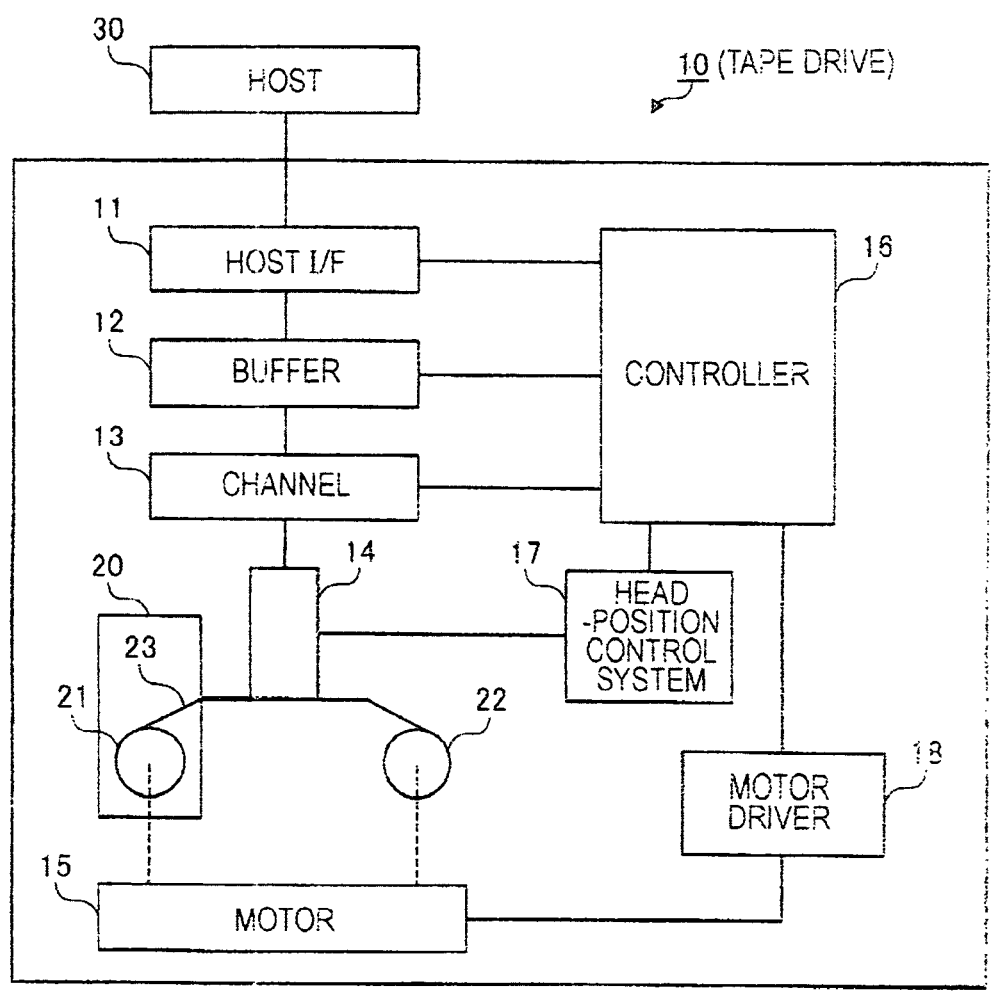
FIG. 1 is block diagram illustrating a configuration of a tape drive to which an embodiment of the invention is applied.

FIG. 1 is a block diagram illustrating a tape drive 10 that includes a host interface (hereinafter referred to as "host I/F") 11, a buffer 12, a channel 13, a head 14, and a motor 15. The tape drive 10 further includes a controller 16, a head-position control system 17, and a motor driver 18.

A tape cartridge 20, which can be loaded by inserting it into the tape drive 10, is also shown. The tape cartridge 20 includes a tape 23 wound on reels 21 and 22. As the reels 21 and 22 move, the tape 23 moves from the reel 21 to the reel 22 or from the reel 22 to the reel 21 in the longitudinal direction. A magnetic tape illustrated as an example of the tape 23 may be replaced with another tape medium.

The host I/F 11 communicates with a host 30 serving as an example of a higher-level device. For example, from the host 30, the host I/F 11 receives a command (first command) for writing data to the tape 23, a command (second command) for moving the tape 23 to a target position, and a command (third command) for reading data from the tape 23. The host I/F 11 uses a communication standard, such as the Small Computer System Interface (SCSI). In the SCSI, a Write command corresponds to the first command, a Locate command or a Space command corresponds to the second command, and a Read command corresponds to the third command. The host I/F 11 returns, to the host 30, a response indicating whether the process corresponding to the received command has succeeded.

The buffer 12 is a memory that stores data to be written to the tape 23 or data read from the tape 23. For example, the buffer 12 is a dynamic random access memory (DRAM). The buffer 12 includes a plurality of buffer segments, each storing a data set serving as a unit of reading and writing with respect to the tape 23.

The channel 13 is a communication path through which data to be written to the tape 23 is sent to the head 14 or through which data read from the tape 23 is received from the head 14. During movement of the tape 23 in the longitudinal direction, the head 14 writes information to the tape 23 or reads information from the tape 23. The motor 15 causes the reels 21 and 22 to rotate. Although the motor 15 is represented by a single rectangular shape in FIG. 1, it is preferable to provide one motor 15 for each of the reels 21 and 22 (i.e., two motors 15 in total).

The controller 16 controls the overall operation of the tape drive 10. For example, according to a command received by the host I/F 11, the controller 16 controls writing of data to or reading of data from the tape 23. The controller 16 also controls the operation of the head-position control system 17 and the motor driver 18.

The head-position control system 17 is a system that tracks one or a plurality of desired wraps. Here, a wrap means a group of a plurality of tracks on the tape 23. When the need for switching a wrap arises, the need for electrically switching the head 14 also arises. Such a switching operation is controlled by the head-position control system 17.

The motor driver 18 drives the motor 15. If two motors 15 are provided as described above, two motor drivers 18 are provided here. If the tape drive 10 of FIG. 1 is an enterprise tape drive TS1120 from IBM in the US, data is written to the tape 23 on a data set basis by the tape drive 10. The data set size is constant.

A distance between adjacent data sets or a distance between the end of one data set and the end of the next data set needs to be within 4 m, due to specification constraints. An ideal distance between adjacent data sets varies depending on the generation, but is about 10 cm in a format for the second-generation enterprise tape drive. If no error occurs, an actual distance between adjacent data sets substantially agrees with the ideal distance.

However, if an error occurs during data writing, since data rewriting is performed up to three times, an actual distance between adjacent data sets may be three times that in normal cases. Moreover, if data cannot be written even when the distance between adjacent data sets is three times that in normal cases, or if data writing is interrupted due to a servo error or the like, the tape drive 10 changes the writing position as necessary so as to try to perform data rewriting. Therefore, the actual distance between adjacent data sets may even be up to 4 m.

At the same time, when the end of the tape 23 approaches during data writing, the tape drive 10 returns a warning message "Early Warning" to the host 30 so that all the data stored in the buffer 12 can be written to the tape 23. In this case, to ensure that all the data stored in the buffer 12 can be written to the tape 23, it is necessary to return the warning message at a position ($4 \times N$) m or more from the end of the tape 23, where N is the maximum number of data sets that can be stored in the buffer 12. This is because it is possible, as described above, that up to 4 m may be required per data set.

The second-generation enterprise tape drive allows 256 data sets to be stored in the buffer 12. Therefore, if the calculation described above is applied here, the tape drive 10 starts returning the warning message at a position about 1000 m from the end of the tape 23. In the TS1120, the tape 23 is about 600 m in length. To ensure that data can be written to the tape 23 until a specified capacity is reached, the tape 23 reciprocates or moves back and forth 28 times. In other words, the tape 23 moves from one reel to another 56 times. Thus, data is written to the tape 23 over a total length of 33600 m, and "1000 m" described above is equivalent to about 3% of the total length. This has a significant impact, particularly in the tape drive 10 having the buffer 12 of large size.

The tape 23 has about 7% room for preventing the capacity from being affected by an error during writing. However, if 3% of the total length is devoted to the warning message "Early Warning", it is possible that data cannot be written until a specified capacity is reached if the tape drive 10 is not in very good working order. Therefore, it is not realistic to start returning "Early Warning" at a position as much as 1000 m from the end of the tape 23 to control the writing operation performed by the host 30.

To avoid impacts on the capacity, the tape drive 10 is configured to start returning the warning message "Early Warning" to the host 30 upon reaching a position ($L \times 2 \times N + 4$) m from the end of the tape 23, where L is an ideal length (m). Therefore, if data is written to a portion near the end of the tape 23 by the tape drive 10 which always requires, for a data writing operation, a length nearly three times that required in normal cases, data in the buffer 12 cannot be completely written to the tape 23.

Thus, in the embodiment, usage of the buffer 12 (i.e., capacity for data in the buffer 12) is limited near the end of the tape 23. This makes it possible to always ensure that all the data in the buffer 12 is written to the tape 23. That is, an upper limit of the amount of use of the buffer 12 is defined by a conditional branch expression as follows:

if ($N < X/4 - 1$)

$n = N$ else $n = X/4 - 1$ where n is an upper limit of the amount of use of the buffer 12 (hereinafter referred to as "usable capacity"), X (m) is a distance from a current position on the tape 23 to the end of the tape 23, and N is the amount of use of the buffer 12 in which data is stored up to the capacity of the buffer 12 (hereinafter referred to as "maximum capacity"). Here, the usable capacity n and the maximum capacity N are represented by the number of data sets. This conditional branch expression will now be explained with reference to FIG. 2.

Figure 2:
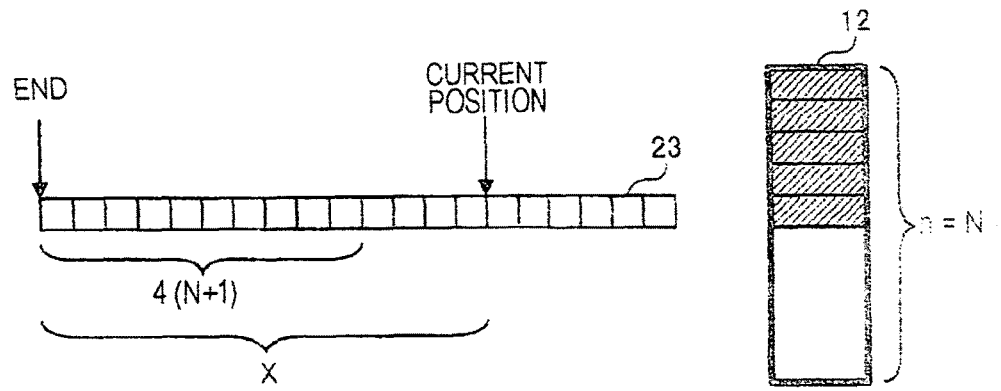
FIG. 2 illustrates an overview of the embodiment of the invention.
Figure 2:
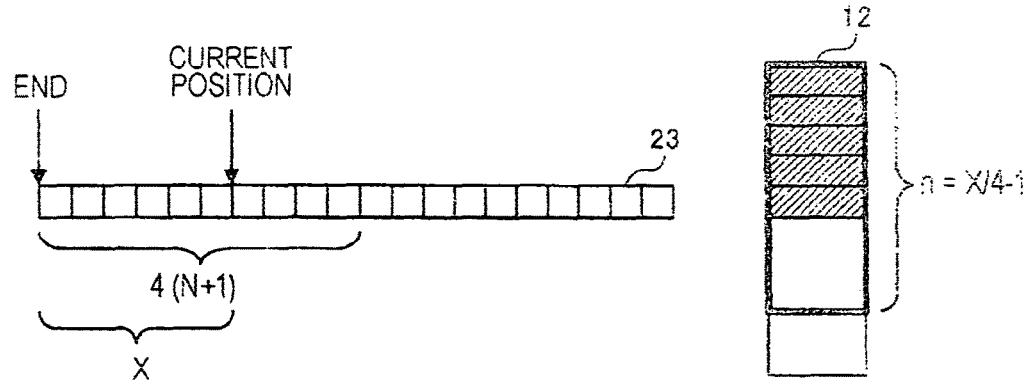

FIG. 2 illustrates how the buffer 12 is used in the embodiment. FIG. 2(a) illustrates the case of "N<X/4−1" which is a condition of the "if" statement in the conditional branch expression described above. This condition can be converted to a condition with respect to the variable X as follows: "X>4(N+1)". That is, if the distance X from the current position on the tape 23 to the end of the tape 23 is greater than 4(N+1), the maximum capacity N of the buffer 12 is set as the usable capacity n of the buffer 12.

FIG. 2(b) illustrates the case of "N≥X/4−1" which is a condition of the "else" statement in the conditional branch expression described above. This condition can be converted to a condition with respect to the variable X as follows: "X≤4(N+1)". That is, if the distance X from the current position on the tape 23 to the end of the tape 23 is less than or equal to 4(N+1), (X/4−1) is set as the usable capacity n of the buffer 12.

In FIG. 2(a) and FIG. 2(b), a thick line in the buffer 12 indicates a usable part of the buffer 12. Next, the controller 16 that realizes the foregoing operation will be described. Here, SCSI commands will be described as examples of commands in the embodiment.

Figure 3:
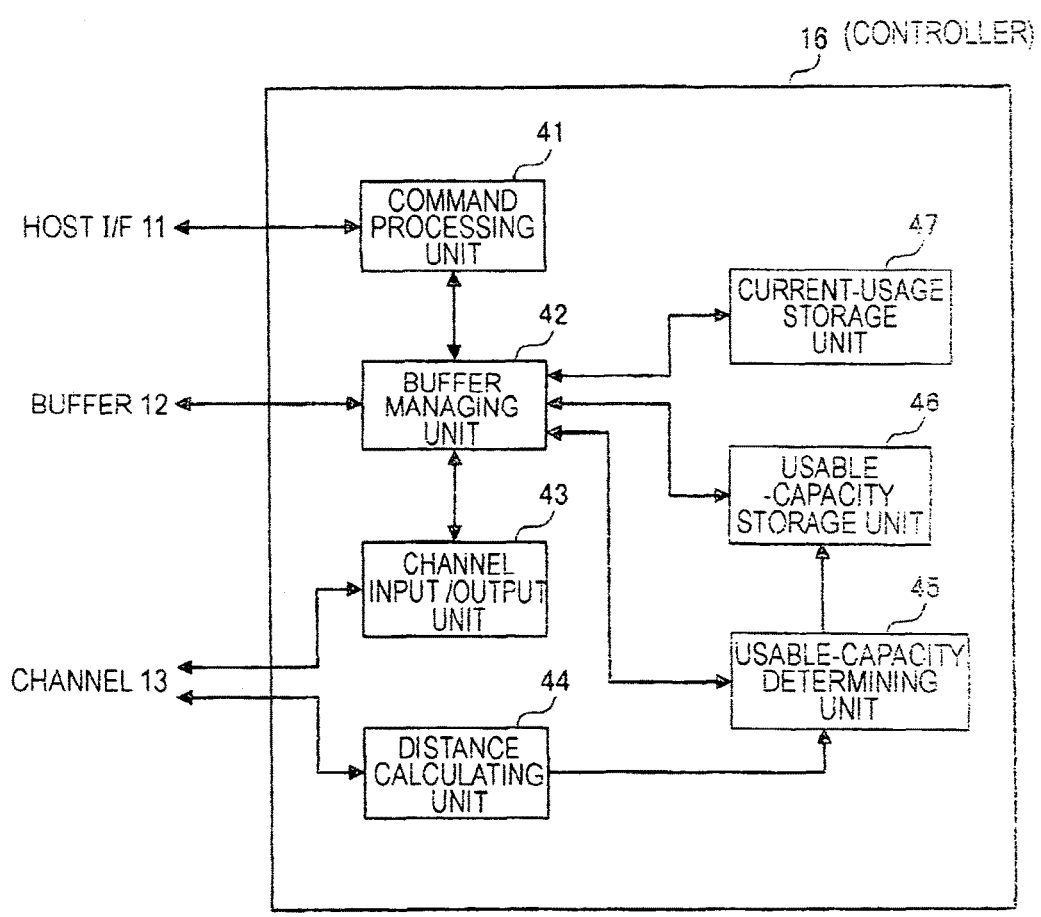
FIG. 3 is a block diagram illustrating a functional configuration of a controller according to an embodiment of the invention.

FIG. 3 is a block diagram illustrating a functional configuration of the controller 16 that includes a command processing unit 41, a buffer managing unit 42, a channel input/output unit 43, a distance calculating unit 44, a usable-capacity determining unit 45, a usable-capacity storage unit 46, and a current-usage storage unit 47. The command processing unit 41 receives a command from the host I/F 11. Examples of the command include a Write command for storing data in the buffer 12 and a Write FileMark (Write FM) command for writing data stored in the buffer 12 to the tape 23.

When the command processing unit 41 receives a Write command, the buffer managing unit 42 directs the usable-capacity determining unit 45 to determine a usable capacity of the buffer 12. Then, on the basis of the usable capacity stored in the usable-capacity storage unit 46 and the amount of data currently stored in the buffer 12, the amount being stored in the current-usage storage unit 47 (hereinafter referred to as "current usage"), the buffer managing unit 42 determines whether data indicated by the Write command is to be stored in the buffer 12. When the command processing unit 41 receives a Write FM command, the buffer managing unit 42 reads data from the buffer 12, passes the read data to the channel input/output unit 43, and subtracts the amount of the read data from the current usage stored in the current-usage storage unit 47. In the present embodiment, the buffer managing unit 42 is provided as an example of a storage unit that stores predetermined data in a buffer.

The channel input/output unit 43 outputs, to the channel 13, data read from the buffer 12 by the buffer managing unit 42. Also, the channel input/output unit 43 stores, in the buffer 12, data received from the channel 13. The distance calculating unit 44 obtains, via the channel 13, information about a current position on the tape 23. The current position is read, through tracking of a servo track, by a servo head serving as the head 14. The distance calculating unit 44 calculates a distance to the end of the tape 23 by using information about the location of the end of the tape 23, the information being stored in advance. In the present embodiment, the distance calculating unit 44 is provided as an example of an identifying unit that identifies the size of an unused area.

The usable-capacity determining unit 45 determines a usable capacity of the buffer 12 on the basis of the distance calculated by the distance calculating unit 44 and a maximum capacity of the buffer 12, the maximum capacity being stored in advance. In the present embodiment, the usable-capacity determining unit 45 is provided as an example of a determining unit that determines an upper limit of a capacity for data that can be stored in the buffer 12.

The usable-capacity storage unit 46 stores the usable capacity determined by the usable-capacity determining unit 45. The current-usage storage unit 47 stores current usage that is the amount of data currently stored in the buffer 12.

The operations performed by the controller 16 include a first operation that involves receiving data from the host 30 and storing the received data in the buffer 12, and a second operation that involves reading the data stored in the buffer 12 and writing the read data to the tape 23. These operations will now be individually described. The first operation is performed when a Write command is received from the host 30. Therefore, the first operation will be described as an operation performed when the controller 16 receives a Write command. The second operation is performed, for example, when a Write FM command is received from the host 30 or when the amount of data in the buffer 12 reaches a predetermined level. Here, the second operation will be described as an operation performed when the controller 16 receives a Write FM command.

Figure 4:
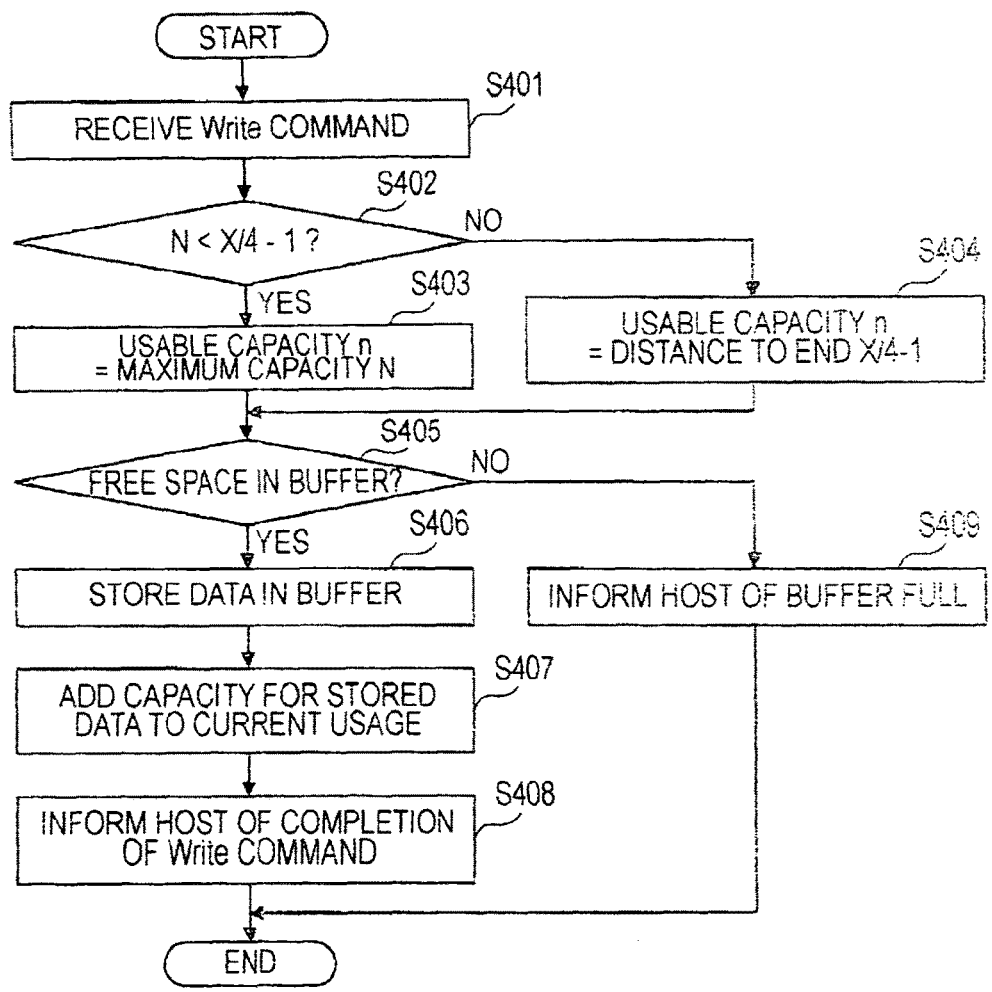
FIG. 4 illustrates an overview of an operation performed when an embodiment of a controller receives a write command.

FIG. 4 is a flowchart illustrating an operation performed by the controller 16 when a Write command is received. This operation is performed on condition that the distance calculating unit 44 obtains from the channel 13 a current position on the tape 23, subtracts the current position from the end position of the tape 23 to determine a distance X (m) from the current position to the end of the tape 23, and holds the distance X. Here, the end position can be obtained, for example, from a cartridge memory in the tape cartridge 20 when the tape cartridge 20 is loaded.

In the controller 16, first, the command processing unit 41 receives a Write command and informs the buffer managing unit 42 of the receipt of the Write command (step S401). Then, the buffer managing unit 42 directs the usable-capacity determining unit 45 to determine a usable capacity of the buffer 12. Thus, the usable-capacity determining unit 45 determines whether the distance to the end of the tape 23 reaches a threshold at which the usable capacity of the buffer 12 needs to be changed.

In other words, the usable-capacity determining unit 45 determines whether the condition "N<X/4−1" is satisfied, where N is the maximum capacity of the buffer 12 and X (m) is the distance from the current position to the end of the tape 23 (step S402). As described above, since the distance calculating unit 44 holds the distance X (m), the usable-capacity determining unit 45 obtains the distance X from the distance calculating unit 44. At the same time, since N is the capacity of the buffer 12, a value held in advance can be used. The maximum tape length "4 m" required for one data set is also a value held in advance and can be used.

As a result, if the condition "N<X/4−1" is satisfied, the usable-capacity determining unit 45 sets the maximum capacity N of the buffer 12 as the usable capacity n (step S403). That is, the maximum capacity N is stored in the usable-capacity storage unit 46 as the usable capacity n. On the other hand, if the condition "N<X/4−1" is not satisfied, the usable-capacity determining unit 45 sets (X/4−1) as the usable capacity n. That is, (X/4−1) is stored in the usable-capacity storage unit 46 as the usable capacity n.

Next, the buffer managing unit 42 determines whether there is free space in the buffer 12 (step S405). Specifically, the buffer managing unit 42 subtracts current usage stored in the current-usage storage unit 47 from the usable capacity stored in the usable-capacity storage unit 46 so as to determine a difference therebetween. Then, the buffer managing unit 42 determines whether a capacity for data stored in the buffer 12 according to the Write command is less than or equal to the difference.

If there is free space in the buffer 12, that is, if the capacity for data in the buffer 12 is less than or equal to the difference, the buffer managing unit 42 obtains data received together with the Write command by the command processing unit 41 and stores the obtained data in the buffer 12 (step S406). Next, the buffer managing unit 42 adds the capacity for data stored in the buffer 12 to the current usage stored in the current-usage storage unit 47 (step S407). Then, the buffer managing unit 42 informs the command processing unit 41 of completion of the Write command, and thus the command processing unit 41 informs the host 30 of the completion of the Write command (step S408).

On the other hand, if there is no free space in the buffer 12, that is, if the capacity for data in the buffer 12 exceeds the difference described above, the buffer managing unit 42 informs the command processing unit 41 of this. Then, the command processing unit 41 informs the host 30 of a buffer full condition and causes the host 30 to wait (step S409).

Figure 5:
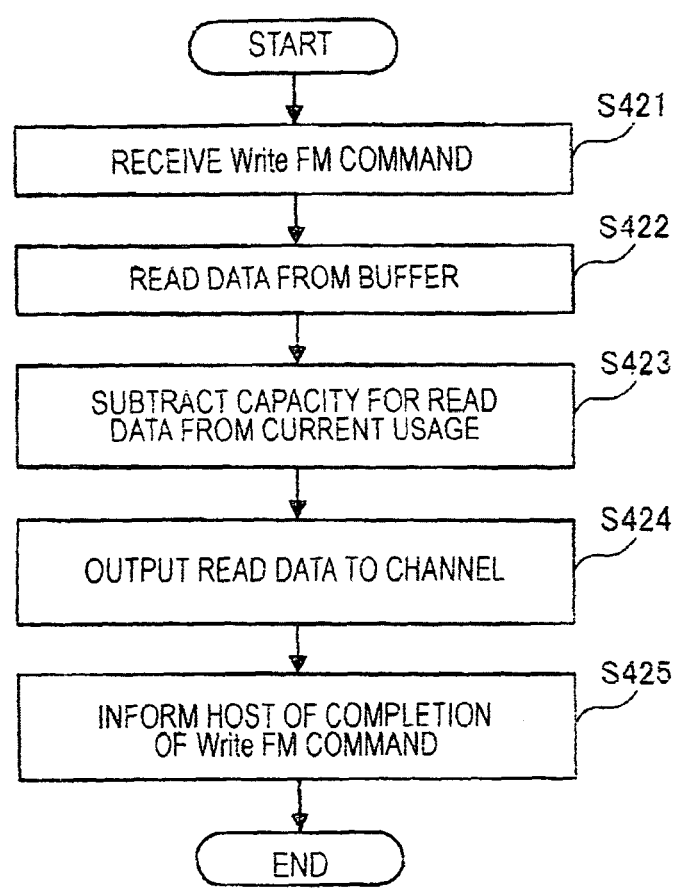
FIG. 5 is a flowchart illustrating an operation performed when an embodiment of a controller receives a write FM command.

FIG. 5 is a flowchart illustrating an operation performed by the controller 16 when a Write FM command is received. In the controller 16, first, the command processing unit 41 receives a Write FM command and informs the buffer managing unit 42 of the receipt of the Write FM command (step S421). Then, the buffer managing unit 42 reads data stored in the buffer 12 and passes the read data to the channel input/output unit 43 (step S422). At the same time, the buffer managing unit 42 subtracts the capacity for the read data from current usage stored in the current-usage storage unit 47 (step S423). For example, when all data stored in the buffer 12 is read and written to the tape 23 in response to the Write FM command, the current usage stored in the current-usage storage unit 47 is cleared to "0".

Next, the channel input/output unit 43 outputs, to the channel 13, the data received from the buffer managing unit 42 so that the data can be written to the tape 23 (step S424). Then, the channel input/output unit 43 informs the command processing unit 41 of completion of the Write FM command, and the command processing unit 41 informs the host 30 of the completion of the Write FM command (step S425).

In the embodiment described above, a value set as the usable capacity n is changed depending on whether the condition "N<X/4−1" is satisfied, and if this condition is not satisfied, the usable capacity n is set to "X/4−1". However, this is only an example. That is, the foregoing condition may be "X (m)>N×4 (m)" (i.e., a distance to the end of the tape 23 is greater than a value obtained by multiplying the maximum capacity N of the buffer 12 by 4 (m)) and if this condition is not satisfied, the usable capacity n of the buffer 12 may be set to "X (m)/4 (m)" (i.e., a value obtained by dividing the distance to the end of the tape 23 by 4 (m)).

The foregoing condition and the value that is set as the usable capacity when the condition is not satisfied may be generalized as follows. That is, the condition may be "a distance to the end of the tape 23 exceeds a predetermined threshold". Here, the predetermined threshold may be any value that is determined on the basis of the number of data sets corresponding to the capacity of the buffer 12 and a tape length required for recording one data set.

The value that is set as the usable capacity when the condition is not satisfied may be any value that is the number of data sets corresponding to a capacity smaller than the capacity of the buffer 12. However, for higher recording efficiency on the tape 23, it is desirable that the usable capacity of the buffer 12 decrease as the distance to the end of the tape 23 decreases. Alternatively, the value that is set as the usable capacity when the condition is not satisfied may be determined according to the distance to the end of the tape 23. It is further desirable to determine the value on the basis of the distance to the end of the tape 23 and a tape length required for recording one data set.

As described above, the embodiment is configured such that the buffer 12 is fully used while there is a sufficient distance to the end of the tape 23, but such that an upper limit of the amount of use of the buffer 12 gradually decreases as the distance to the end of the tape 23 decreases. Thus, in the present embodiment, it is possible to prevent data in the buffer from not being completely written to the recording medium while maintaining a high level of recording efficiency on the recording medium.

With this configuration, when "Early Warning" is issued or X=L×2×N+4 is satisfied, n=12 is obtained in the second-generation enterprise tape drive where L=0.1 (m) and N=256. That is, since the usable capacity of the buffer 12 is one-twentieth the capacity of the buffer 12, the tape drive 10 cannot benefit from the buffer 12 in terms of performance.

However, this does not pose a specific problem, for reasons described below. First, it is unusual that "Early Warning" is actually issued, and data can be written to the tape 23 up to a specified capacity normally while "N<X/4−1" is satisfied. Second, for example, in a drive which is in poor condition and takes nearly three times longer than the time typically required to write data to the tape 23, even if the buffer 12 is fully used, performance achieved is only about one-third that of a drive in good condition, and thus, the size of the buffer 12 does not create a bottleneck.

The technique described above is applicable not only to the tape drive 10 of FIG. 1, but also to other storage devices, such as a hard disk drive (HDD) that uses a different segment when data cannot be written to a given area. When the technique described above is applied to another storage device, the usable capacity of the buffer 12 will be determined not on the basis of the distance to the end of the recording medium, but on the basis of the size of an unused area of the recording medium.

The invention may be implemented by hardware, software, or a combination of both. Also, the invention may be embodied as a computer, a data processing system, or a computer program, which can be stored on a computer-readable medium and distributed. The medium may be an electronic, magnetic, optical, electromagnetic, infrared, or semiconductor system (or device or apparatus) or a propagation medium. Examples of the computer-readable medium include a semiconductor or solid-state storage device, a magnetic tape, a removable computer diskette, a random-access memory (RAM), a read-only memory (ROM), a rigid magnetic disk, and an optical disk. Examples of currently available optical disks include a compact-disk read-only memory (CD-ROM), a compact disk read/write (CD-R/W), and a digital versatile disk (DVD).

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for writing data in a buffer to a recording medium according to a command from a higher-level device, the apparatus comprising:
   a head for reading a servo track on the recording medium;
   a channel coupled to the head;
   at least one motor for moving the recording medium across the head;
   a head-position control system configured to switch a location of the head from one track to another track in a wrap on the recording medium, the wrap comprising a plurality of tracks;
   a distance calculating unit configured to obtain from the channel a current position for writing on the recording medium acquired from the servo track by the head, the distance calculating unit being configured to calculate a distance from the current position for writing on the recording medium to an end of the recording medium;
   a determining unit configured to determine, based on the distance to the end of the recording medium, an upper limit of a capacity for data that can be stored in the buffer, wherein the determining unit determines the upper limit using a branch expression:

if $(N<X/4-1)$, $n=N$;

else $n=X/4-1$, where n is the number of data sets corresponding to the capacity of the buffer as the upper limit, and
   X represents the size of an unused area of the recording medium;
   a storage unit configured to store, according to a command for storing predetermined data in the buffer, the predetermined data in the buffer on condition that the capacity for data in the buffer does not exceed the upper limit,
   wherein the predetermined data in the buffer includes a plurality of data sets,
   wherein the determining unit is configured to determine a number of data sets corresponding to a capacity of the buffer as the upper limit when the distance to the end of the recording medium exceeds a predetermined threshold,
   wherein the determining unit is configured to determine the number of data sets corresponding to a capacity smaller than the capacity of the buffer as the upper limit when the distance to the end of the recording medium is less than or equal to the predetermined threshold,
   wherein only the number of determined data sets are allowed to be stored in the buffer; and
   wherein a warning message indicative of approach of an end position of the recording medium is sent when the distance to the end of the recording medium is at least 4×N meters, where N represents the number of data sets corresponding to a maximum capacity of the buffer.

2. The apparatus according to claim 1, wherein the determining unit determines a capacity of the buffer as the upper limit in response to determining that the distance to the end of the recording medium exceeds a predetermined threshold, wherein the determining unit determines a capacity smaller than the capacity of the buffer as the upper limit in response to determining that the distance to the end of the recording medium is less than or equal to the predetermined threshold.

3. The apparatus according to claim 1, wherein the determining unit determines the upper limit such that the upper limit decreases as distance to the end of the recording medium decreases in response to determining that the distance to the end of the recording medium is less than or equal to the predetermined threshold.

4. The apparatus according to claim 1, wherein the determining unit determines the number of data sets corresponding to the distance to the end of the recording medium as the number of data sets corresponding to the capacity smaller than the capacity of the buffer in response to determining that the distance to the end of the recording medium is less than or equal to the predetermined threshold.

5. The apparatus according to claim 1, wherein the recording medium is a magnetic recording tape, and comprising a controller for instructing writing of data in tracks on the magnetic recording tape as the magnetic recording tape moves back and forth between reels at least 20 times, thereby creating a plurality of parallel wraps extending between distal ends of the magnetic recording tape.

6. The apparatus according to claim 1, wherein the determining unit determines the predetermined threshold on the basis of the number of data sets corresponding to the capacity of the buffer and a size determined in advance as a size of an area required for recording one data set.

7. The apparatus according to claim 1, wherein the predetermined data includes a plurality of data sets; and the storage unit stores the predetermined data in the buffer in response to determining the number of data sets included in the predetermined data does not exceed a difference between the number of data sets corresponding to the upper limit and the number of data sets stored in the buffer.

8. The apparatus according to claim 1, wherein the data sets are each of the same size, wherein the determining unit determines the predetermined threshold on the basis of the number of data sets corresponding to the capacity of the buffer and a size determined in advance as a size of an area required for recording one data set.

9. A method, comprising:
   determining a current writing position on a magnetic recording tape based directly on tracking of a servo track on the magnetic recording tape;
   calculating a distance from an end position of the magnetic recording tape to the current writing position on the magnetic recording tape, wherein the calculated distance is at least sometimes greater than a total physical length of the magnetic recording tape measured between distal ends thereof;
   determining, on the basis of the calculated distance, an upper limit of a capacity for data that can be stored in a buffer,
   wherein the upper limit is determined using a branch expression:

if $(N<X/4-1)$, $n=N$;

else $n=X/4-1$, where n is the number of data sets corresponding to the capacity of the buffer as the upper limit,
   X represents the size of an unused area of the magnetic recording tape, and
   N represents a number of data sets corresponding to a maximum capacity of the buffer; and
   storing, according to a command for storing predetermined data in the buffer, the predetermined data in the buffer on condition that the capacity for data in the buffer does not exceed the upper limit; and sending a warning message indicative of approach of the end position of the magnetic recording tape when the distance to the end position of the magnetic recording tape is at least 4×N meters.

10. The method according to claim 9, comprising obtaining the end position of the magnetic recording tape from a cartridge memory of a tape cartridge housing the magnetic recording tape.

11. The method according to claim 9, wherein the upper limit of the capacity for data that can be stored in the buffer is a value that is a number of data sets.

12. The method according to claim 9, comprising obtaining the end position from a tape cartridge housing the magnetic recording tape.

* * * * *